(12) United States Patent
Johnson

(10) Patent No.: US 7,028,846 B1
(45) Date of Patent: Apr. 18, 2006

(54) FISH GRADING DEVICE

(75) Inventor: Ivor Gilbert Johnson, Vidlin (GB)

(73) Assignee: Grading Systems (UK) Limited, Shetland (GB)

(*) Notice: Subject to any disclaimer, the term of this patent is extended or adjusted under 35 U.S.C. 154(b) by 126 days.

(21) Appl. No.: 10/129,468

(22) PCT Filed: Nov. 3, 2000

(86) PCT No.: PCT/GB00/04208

§ 371 (c)(1),
(2), (4) Date: May 3, 2002

(87) PCT Pub. No.: WO01/32010

PCT Pub. Date: May 10, 2001

(30) Foreign Application Priority Data

Nov. 5, 1999 (GB) .................................. 9926195

(51) Int. Cl.
*A01K 75/00* (2006.01)
*B07B 13/075* (2006.01)

(52) U.S. Cl. .............................. 209/660; 209/667; 43/7
(58) Field of Classification Search .................... 43/7, 43/9.2; 209/660, 667, 668, 674, 676, 263, 209/264, 401
See application file for complete search history.

(56) References Cited

U.S. PATENT DOCUMENTS

| | | | | |
|---|---|---|---|---|
| 3,833,119 A * | 9/1974 | Brown | ........................ | 209/675 |
| 4,086,875 A * | 5/1978 | Lindbergh | ................... | 119/216 |
| 4,673,015 A * | 6/1987 | Andreasson | ................ | 152/231 |
| 5,158,489 A * | 10/1992 | Araki et al. | .................. | 441/80 |
| 5,329,719 A * | 7/1994 | Holyoak | ........................ | 43/6.5 |
| 6,223,462 B1 * | 5/2001 | Johannesson | ................. | 43/9.2 |

* cited by examiner

*Primary Examiner*—Joseph Rodriguez
(74) *Attorney, Agent, or Firm*—Zilka-Kotab, PC

(57) ABSTRACT

A fish grading device is provided including a framework of substantially rigid elongate members pivotably interconnected to form a plurality of loops, wherein each the loop is formed from a plurality of the substantially rigid elongate members and defines an aperture not exceeding predetermined dimensions.

9 Claims, 3 Drawing Sheets

FISH GRADING DEVICE

CROSS-REFERENCE TO RELATED APPLICATIONS

The present application claims the priority of a United Kingdom patent filed May 11, 1999 under application number 9926195.0.

The present application claims priority of a UK application filed Nov. 5, 1999 under the following serial number: 9926195.0, which is incorporated herein by reference in its entirety.

BACKGROUND OF THE INVENTION

The present invention relates to fish grading devices and relates particularly, but not exclusively, to fish grading devices for incorporation into fishing nets.

BACKGROUND OF THE INVENTION

Fish grading devices are known which consist of a fishing net having a mesh size such that fish above a certain size cannot swim through the net and are therefore retained in the net, while smaller fish can escape through the apertures in the net. Known fish grading devices of this type suffer from the disadvantage that fish can be injured by becoming snagged on the net while trying to pass through the apertures.

BRIEF SUMMARY OF THE INVENTION

Preferred embodiments of the present invention seek to overcome the above disadvantages of the prior art.

According to an aspect of the present invention, there is provided a fish grading device comprising a framework of substantially rigid elongate members pivotably interconnected to form a plurality of loops, wherein each said loop is formed from a plurality of said substantially rigid elongate members and defines an aperture not exceeding predetermined dimensions.

By providing a plurality of loops formed by interconnected substantially rigid members such that each loop is pivotable relative to the or each loop adjacent thereto, this gives the advantage that fish are less likely to become snagged on the substantially rigid elongate members than on threads of a fishing net, but the fish grading device is still sufficiently flexible that it can be wound onto a reel or otherwise made compact for convenient handling or transport.

In a preferred embodiment, each said substantially rigid elongate member can rotate about its longitudinal axis.

This provides the advantage of minimising the risk that a fish will become snagged on one of the substantially rigid elongate members while trying to pass through one of the apertures of the device.

Each said substantially rigid elongate member may be tubular.

The substantially rigid elongate members may be interconnected by means of elongate flexible members.

In the case of tubular substantially rigid elongate members being interconnected by elongate flexible members, this provides the advantage that the fish grading device is flexible when not under tension, but becomes rigid when under tension such that the apertures remain of substantially constant dimensions.

The or each said elongate flexible member may be a string or thread.

The or each said elongate flexible member may form a respective loop corresponding to each said loop of said interconnected substantially rigid elongate members.

At least one said substantially rigid elongate member may be slidable longitudinally relative to the corresponding elongate flexible member.

In a preferred embodiment, a plurality of said loops of elongate members are each formed from four said substantially rigid elongate members.

Each of said loops of substantially rigid elongate members is preferably substantially rectangular.

According to another aspect of the invention, there is provided a fishing net including a fish grading device as defined above.

BRIEF DESCRIPTION OF THE SEVERAL VIEWS OF THE DRAWING

A preferred embodiment of the invention will now be described, by way of example only and not in any limitative sense, with reference to the accompanying drawings, in which:—

DETAILED DESCRIPTION

Figure 1:
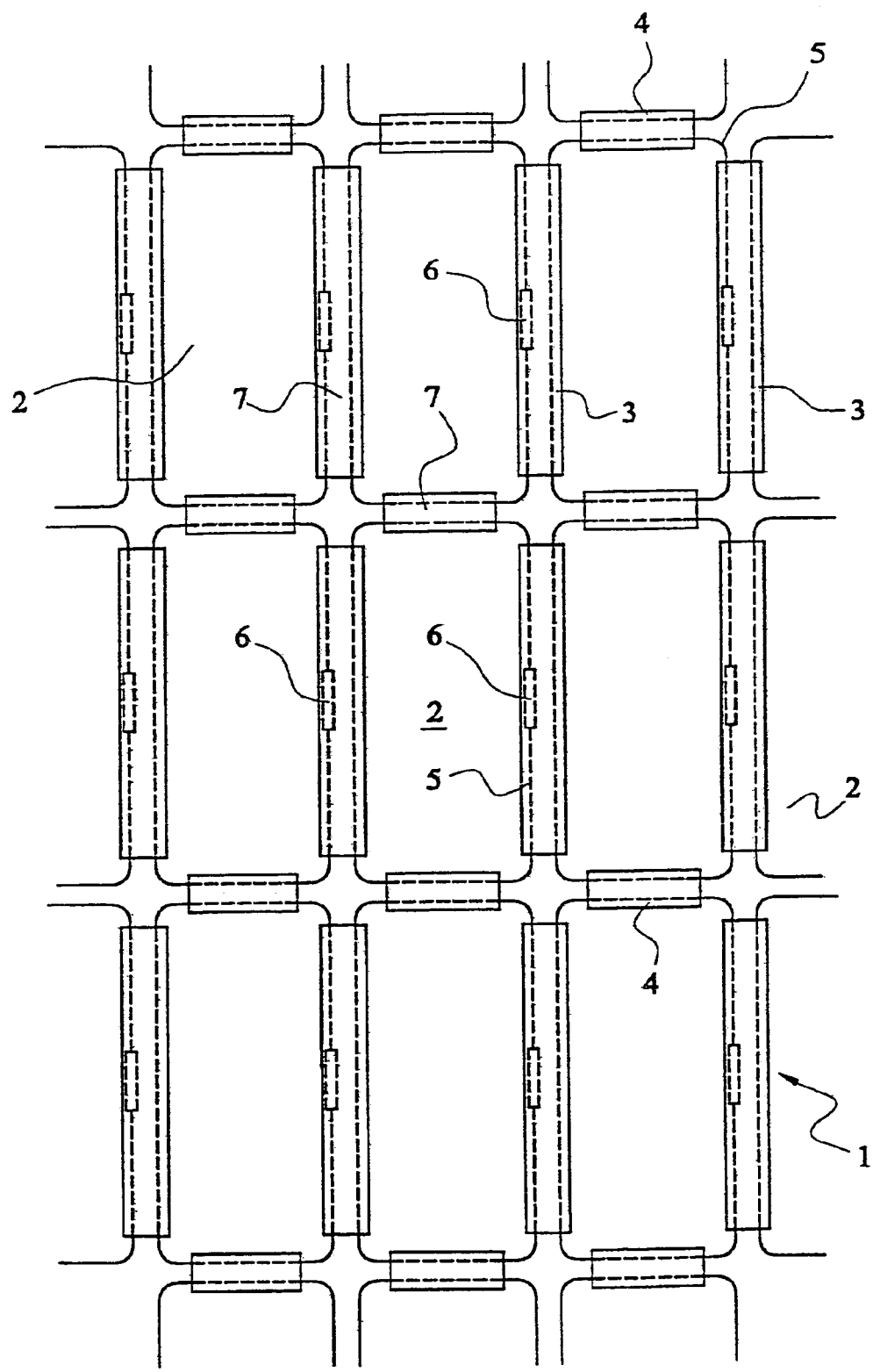
FIG. 1 is a schematic elevation view of part of a fish grading device embodying the present invention.

Referring to FIG. 1, a fish grading device 1 is formed from an array of generally rectangular apertures 2, each of which is formed by two long tubes 3 and two short tubes 4 of plastics material mounted to a loop of fishing net 5. Each loop of fishing net 5 is formed by crimping the ends of the loop by means of a metal crimp 6. Each of the tubes 3, 4 can rotate freely about its longitudinal axis, so that a fish brushing against a tube 3, 4 will cause the tube to rotate, and will therefore avoid becoming snagged on the tube.

Tubes 3, 4 defining two adjacent apertures will have two loops of fishing line 5 passing therethrough, for example as shown at locations 7. When the fish grading device 1 is placed under tension, the dimensions of apertures 2 are prevented by tubes 3, 4 from being reduced, but when the device 1 is not under tension, it is relatively flexible, and can therefore be handled easily, for example would onto a reel on a fishing boat.

Figures 2A, 2B:
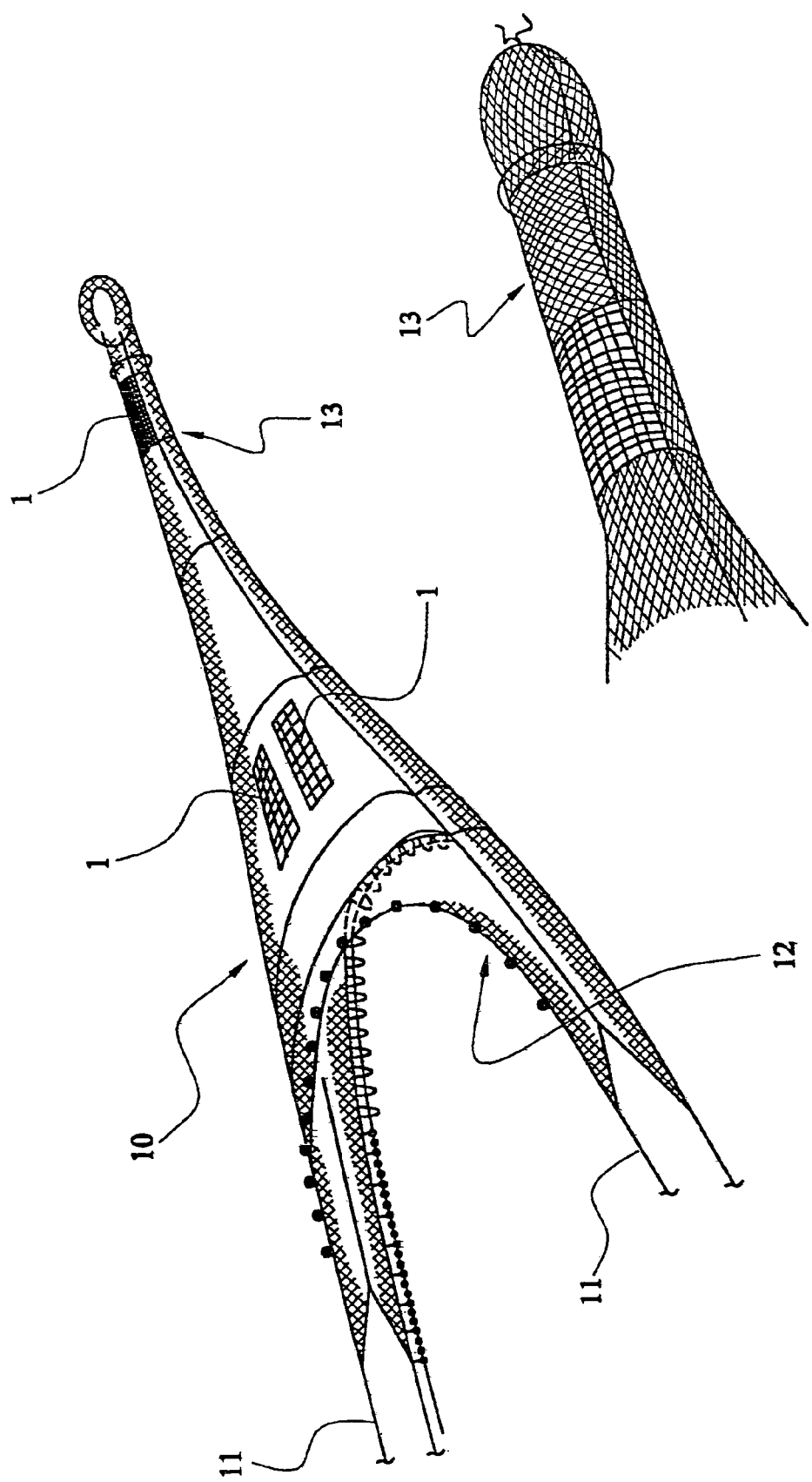
FIG. 2A is a perspective view of a first embodiment of fishing net incorporating the fish grading device of FIG. 1.
FIG. 2B is an enlarged view of part of the fishing net of FIG. 2A.

Referring now to FIG. 2A, a fishing net 10 for use in the commercial fishing sector is dragged by means of lines 11 by a boat (not shown) such that fish are drawn into mouth 12 of the net 10. The net 10 is provided with a number of panels formed by fish grading devices 1, three such panels being shown in FIG. 2A, two of which are in the central location of the net 10, and one of which is at cod end 13 of the net (FIG. 2B).

The operation of the net shown in FIGS. 2A and 2B will now be described.

When the net 10 is dragged behind a boat, fish are drawn into the net 10, and only fish that are sufficiently small to pass through apertures 2 (FIG. 1) can escape from the net. As a result, larger fish are retained in the net, while smaller fish can escape.

As the net 10 is dragged behind the boat, the loops 5 of the fish grading device 1 are placed under tension, as a result of which the tubes 3, 4 are drawn closer together and the rigidity of the tubes prevents the dimensions of the apertures from reducing. At the same time, if a fish is trying to pass through one of the apertures 2 and is caused by other fish to be pressed against one of the tubes 3, 4, the tube 3, 4 can rotate about its longitudinal axis, which reduces the risk of a fish becoming injured by becoming snagged on the threads of the fishing net.

Figure 3:
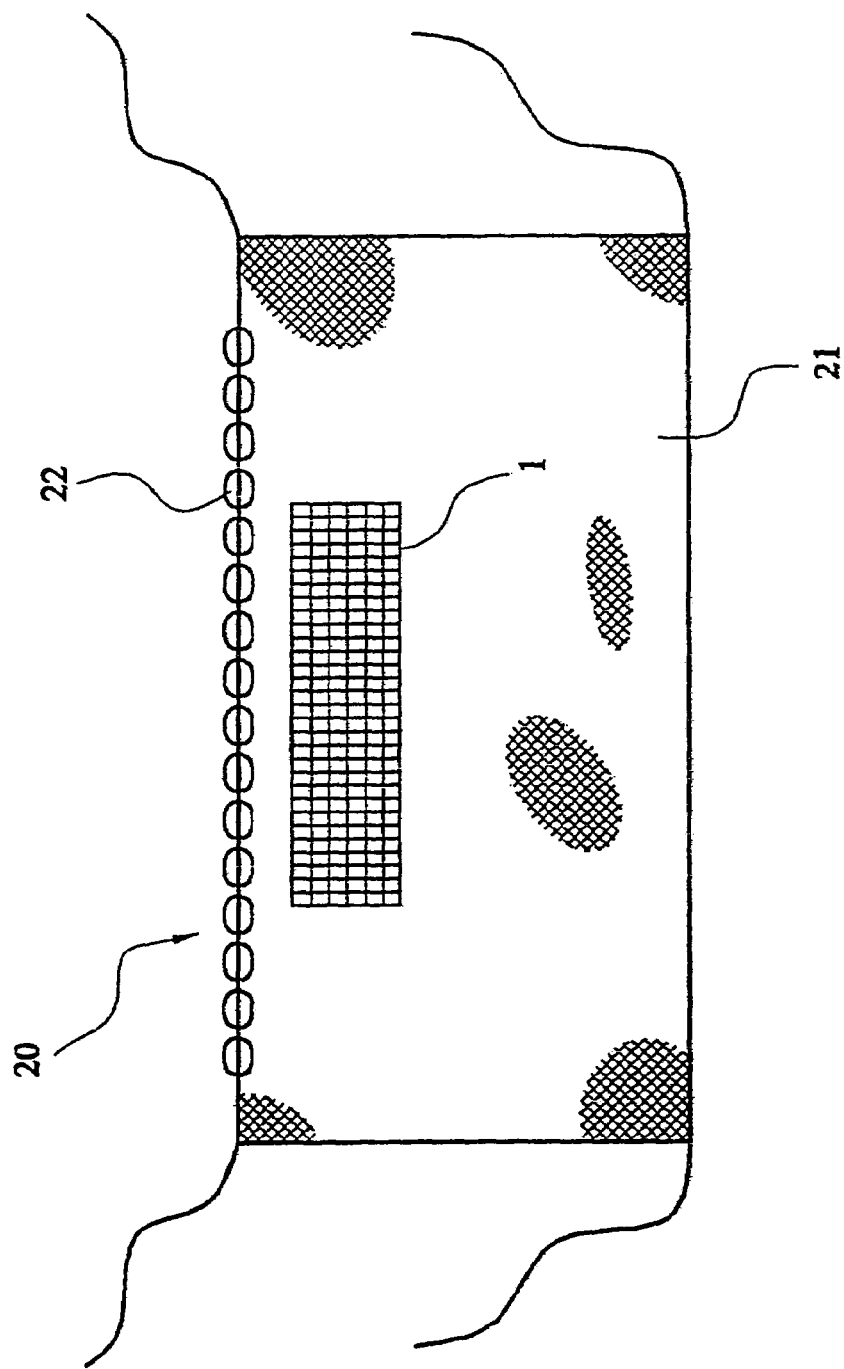
FIG. 3 is a schematic elevation view of a second embodiment of fishing net incorporating the fish grading device of FIG. 1.

FIG. 3 shows a sweep net for use in the aquaculture industry in confining fish to a selected volume of water, for example within a sea cage or shore tank system of a fish farm. The sweep net 20 is formed by a net 21 suspended from float 22, and incorporating a fish grading device 1 as shown in FIG. 1.

It will be appreciated by persons skilled in the art that the above embodiments have been described by way of example only, and not in any limitative sense, and that various alterations and modifications are possible without departure from the scope of the invention as defined by the appended claims.

The invention claimed is:

1. A fish grading device comprising a framework of substantially rigid elongate members pivotably interconnected to form a plurality of loops, wherein each said loop is formed from a plurality of said substantially rigid elongate members and defines an aperture not exceeding predetermined dimensions, wherein each said substantially rigid elongate member can rotate about its longitudinal axis.

2. A device according to claim 1, wherein each said substantially rigid elongate member is tubular.

3. A device according to claim 1, wherein the substantially rigid elongate members are interconnected by means of elongate flexible members.

4. A device according to claim 3, wherein the or each said elongate flexible member is a string or thread.

5. A device according to claim 3, wherein the or each said elongate flexible member forms a respective loop corresponding to each said loop of said interconnected substantially rigid elongate members.

6. A fishing net including a fish grading device, according to claim 1.

7. A fish grading device comprising a framework of substantially rigid elongate members pivotably interconnected to form a plurality of loops, wherein each said loop is formed from a plurality of said substantially rigid elongate members and defines an aperture not exceeding predetermined dimensions, wherein the substantially rigid elongate members are interconnected by means of elongate flexible members, wherein the or each said elongate flexible member forms a respective loop corresponding to each said loop of said interconnected substantially rigid elongate members, wherein at least one said substantially rigid elongate member is slidable longitudinally relative to the corresponding elongate flexible member.

8. A fish grading device comprising a framework of substantially rigid elongate members pivotably interconnected to form a plurality of loops, wherein each said loop is formed from a plurality of said substantially rigid elongate members and defines an aperture not exceeding predetermined dimensions, wherein the substantially rigid elongate members are interconnected by means of elongate flexible members, wherein the or each said elongate flexible member forms a respective loop corresponding to each said loop of said interconnected substantially rigid elongate members, wherein a plurality of said loops of elongate members are each formed from four said substantially rigid elongate members.

9. A device according to claim 8, wherein each of said loops of substantially rigid elongate members is substantially rectangular.

* * * * *

UNITED STATES PATENT AND TRADEMARK OFFICE
CERTIFICATE OF CORRECTION

| | |
|---|---|
| PATENT NO. | : 7,028,846 B1 |
| APPLICATION NO. | : 10/129468 |
| DATED | : April 18, 2006 |
| INVENTOR(S) | : Ivor Gilbert Johnson |

Page 1 of 1

It is certified that error appears in the above-identified patent and that said Letters Patent is hereby corrected as shown below:

Column 2, line 53, replace "would" with --wound--

Signed and Sealed this

Twenty-fourth Day of April, 2007

JON W. DUDAS
*Director of the United States Patent and Trademark Office*